United States Patent [19]

Tanaka

[11] Patent Number: 5,757,737
[45] Date of Patent: May 26, 1998

[54] RECORDING/REPRODUCING DATA UNITS IN SUCCESSIVE SECTORS BY N HEADS USING N MEMORY DEVICES

[75] Inventor: Hisao Tanaka, Tokyo, Japan

[73] Assignee: Sony Corporation, Tokyo, Japan

[21] Appl. No.: 712,997

[22] Filed: Sep. 10, 1996

[30] Foreign Application Priority Data

Sep. 11, 1995 [JP] Japan .................................. 7-232964

[51] Int. Cl.⁶ .................................................. G11B 7/00
[52] U.S. Cl. .................................................. 369/32; 369/60
[58] Field of Search .................................. 369/32, 60, 59, 369/58, 47, 49

[56] References Cited

U.S. PATENT DOCUMENTS 5,442,612  8/1995  Takeuchi et al. ..................... 369/49
5,493,548  2/1996  Kamioka ............................... 369/49
5,506,825  4/1996  Gushima et al. ..................... 369/49
5,519,682  5/1996  Ito et al. ............................... 369/49
5,539,711  7/1996  Mitani .................................. 369/32
5,563,855  10/1996 Nakase et al. ........................ 369/32
5,563,859  10/1996 Masuda et al. ....................... 369/59
5,587,978  12/1996 Endo et al. ........................... 369/49

Primary Examiner—Nabil Hindi
Attorney, Agent, or Firm—William S. Frommer; Alvin Sinderbrand

[57] ABSTRACT

Successive bytes of data are recorded in successive sectors on a disk medium by N recording heads. Successive data units, each formed of multiple bytes, are written sequentially into N memory devices, and those N memory devices are sequentially read to supply a data unit from one memory device to a corresponding recording head, thereby recording a data unit in successive sectors on the disk medium. The same N heads can be used to reproduce the recorded bytes from the disk medium.

17 Claims, 13 Drawing Sheets

F I G. 12
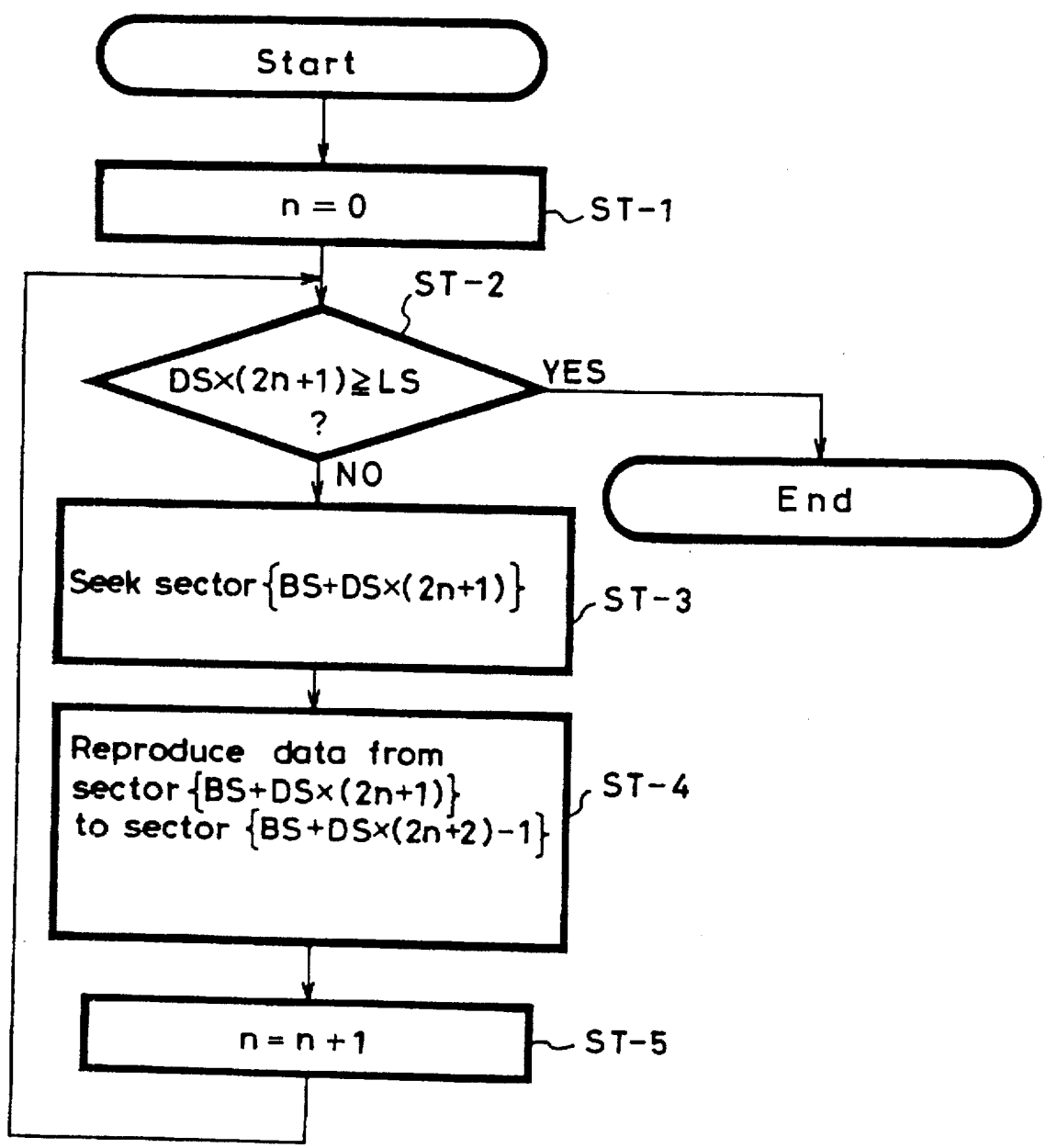

RECORDING/REPRODUCING DATA UNITS IN SUCCESSIVE SECTORS BY N HEADS USING N MEMORY DEVICES

BACKGROUND OF THE INVENTION

This invention relates to a technique for recording/reproducing bytes continuously on a disk medium and, more particularly, to such a technique wherein N heads (N is a integer≥2) record/reproduce successive bytes in successive sectors in respective areas on the disk.

To record data on a disk, such as a magnetic disk, an optical disk, a magneto-optic disk, and the like at a high transfer rate, N recording heads are used to record data in different areas on the disk. For example, and for simplification, when two heads are used, each head records data in respective tracks extending from an inner diameter to an outer diameter on the disk. One head may record data in an inner zone separate and apart from the outer zone in which data is recorded by the other head. FIG. 1 schematically illustrates the two zones, identified as areas RA and RB recorded by heads A and B, respectively.

A stream of continuous data, that is, data that is supplied as successive bytes, such as byte 1, byte 2, byte 3, byte 4, etc. is separated into two channels, namely channel A and channel B. As shown in FIG. 1, the odd bytes (e.g. byte 1, byte 3, byte 5, etc.) are supplied to head A and the even bytes (e.g. byte 2, byte 4, byte 6, etc.) are supplied to head B. Head A records a multiple of sectors in area RA and head B likewise records a multiple of sectors in area RB. As a numerical example, each area may have 100,000 sectors recorded therein, such that head A records in area RA sectors 1, 2, 3, . . . 100,000 and head B records in area RB sectors 100,001, 100,002, . . . 200,000. Each sector contains several bytes; and as depicted in FIG. 1, the odd bytes are recorded in the sectors in area RA and the even bytes are recorded in the sectors in area RB.

With the recording technique represented by FIG. 1, successive bytes are recorded in sectors that are spaced far apart. It is appreciated that byte 1 is recorded in sector 1, byte 2 is recorded in sector 100,001, byte 3 is recorded in sector 1, byte 4 is recorded in sector 100,001, and so on. Since heads A and B are operable independently of each other, head A may record bytes in area RA at the same time that head B records bytes in areas RB. When compared to a recording device that includes only a single head, it is appreciated that, by using two heads, the transfer rate at which data is recorded may be doubled. It will be understood that when N heads are used, the transfer rate may be increased by a multiple of N, as compared to the transfer rate that obtains when only a single head is used.

When the data recorded by N heads is reproduced from the disk medium, N playback heads should be used so as to recover the recorded bytes at a transfer rate that is as high as the recording transfer rate. Consistent with the example shown in FIG. 1, the playback apparatus should include two heads A and B for reproducing the bytes recorded in the respective sectors in areas RA and RB.

However, if the disk medium is removable, such as an optical disk, a magneto-optic disk, a floppy disk, or the like, the apparatus used to reproduce the data recorded by N heads may not itself include N heads. Rather, the playback apparatus may include a single playback head which is driven to reproduce the data recorded in areas RA and RB in a manner such that the original continuous data (i.e. byte 1, byte 2, byte 3, byte 4, etc.) is recovered. To achieve such recovery of continuous data, the head must jump between area RA and RB alternately to recover byte 1 from sector 1, then byte 2 from sector 100,001, then byte 3 from sector 1, then byte 4 from sector 100,001, etc. It is appreciated that this attempt to recover continuous data means that the head is subjected to an inordinate amount of seek operations; and since the seek time of a typical disk drive is relatively slow (e.g. on the order of milliseconds), the playback transfer rate is inordinately slow. That is, it simply is not practical to reproduce data that had been recorded in the format shown in FIG. 1 with a single playback head.

Similarly, it is not practical to use a single recording head to record data in the format shown in FIG. 1, even if two (or more) playback heads are used to recover that data. While data in the format shown in FIG. 1 can be recorded and reproduced efficiently by using the same number of heads for both recording and reproduction, it is highly inefficient and not practical to use a single head for recording and plural heads for playback or, alternatively, to use plural heads for recording and a single head for playback.

OBJECTS OF THE INVENTION

Therefore, it is an object of the present invention to provide a technique for recording and/or reproducing continuous data, wherein N heads can be used for recording and only one head is needed for reproduction or, conversely, N heads can be used for reproduction but only one head is needed for recording.

Another object of this invention is to provide a recording/reproducing technique which uses N heads, thereby achieving a high transfer rate for recording and reproducing the data.

A further object of this invention is to provide an improved technique for recording/reproducing data at a high transfer rate which avoids the aforenoted problems associated with the format shown in FIG. 1.

Various other objects, advantages and features of the present invention will become readily apparent from the ensuing detailed description, and the novel features will be particularly pointed out in the appended claims.

SUMMARY OF THE INVENTION

In accordance with this invention, a recording technique is provided to record successive bytes of data in successive sectors on a disk medium by N recording heads, where N is an integer greater than or equal to 2 (N≥2). Successive bytes are divided into successive data units, each data unit being formed of multiple bytes. Each of N successive data units is written into a respective one of N memory devices; and a data unit from a respective memory device is read to a predetermined one of the N recording heads for recording in several successive sectors by that head. The foregoing operation is repeated, in sequence, from head to head, resulting in the recording of a data unit in one area on a disk medium, by one head, followed by a data unit recorded in another data area on the disk medium, by another head, and so. If N=2, then the two heads alternate to record successive data units in respective areas. While one head records one data unit, the other head may seek the next area to record the next data unit. That is, while one head undergoes a recording operation, the other undergoes a seek operation.

As a feature of this invention, if a total of IB successive bytes are supplied for recording on the disk medium, and if each memory device exhibits a memory capacity of BB bytes, then the size of a data unit need not be fixed but, rather, may by equal to BB bytes when (IB/N)>BB; and may be equal to IB/N bytes when (IB/N)≤BB.

Consist with one aspect of this invention, each recording head records several successive sectors in a given area on a disk, such that if there are N recording heads, the successive sectors are recorded first in area 1 then in area 2, then in area 3... then in area N. This operation repeats for the next group of N areas.

The present invention also is directed to a technique for using N reproducing heads to reproduce the data bytes that are recorded in successive sectors in respective areas in accordance with the aforedescribed recording technique.

BRIEF DESCRIPTION OF THE DRAWINGS

The following detailed description, given by way of example and not intended to limit the present invention solely thereto, will best be understood in conjunction with the accompanying drawings in which:

FIGS. 11 and 12 are flowcharts which are helpful in explaining how the apparatus shown in FIG. 9 reproduces data.

DETAILED DESCRIPTION OF PREFERRED EMBODIMENTS

Figure 1:
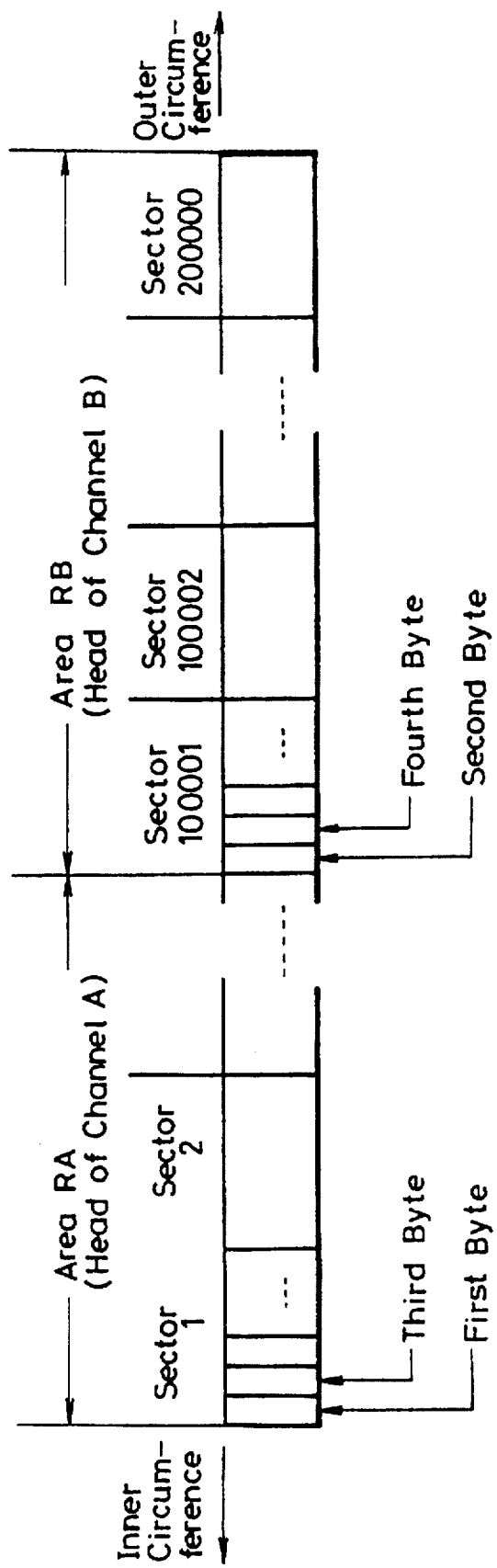
FIG. 1 is a schematic representation of one data recording format that requires an equal number of playback and recording heads and, thus, suffers from the disadvantage which is overcome by the present invention.
Figure 2:
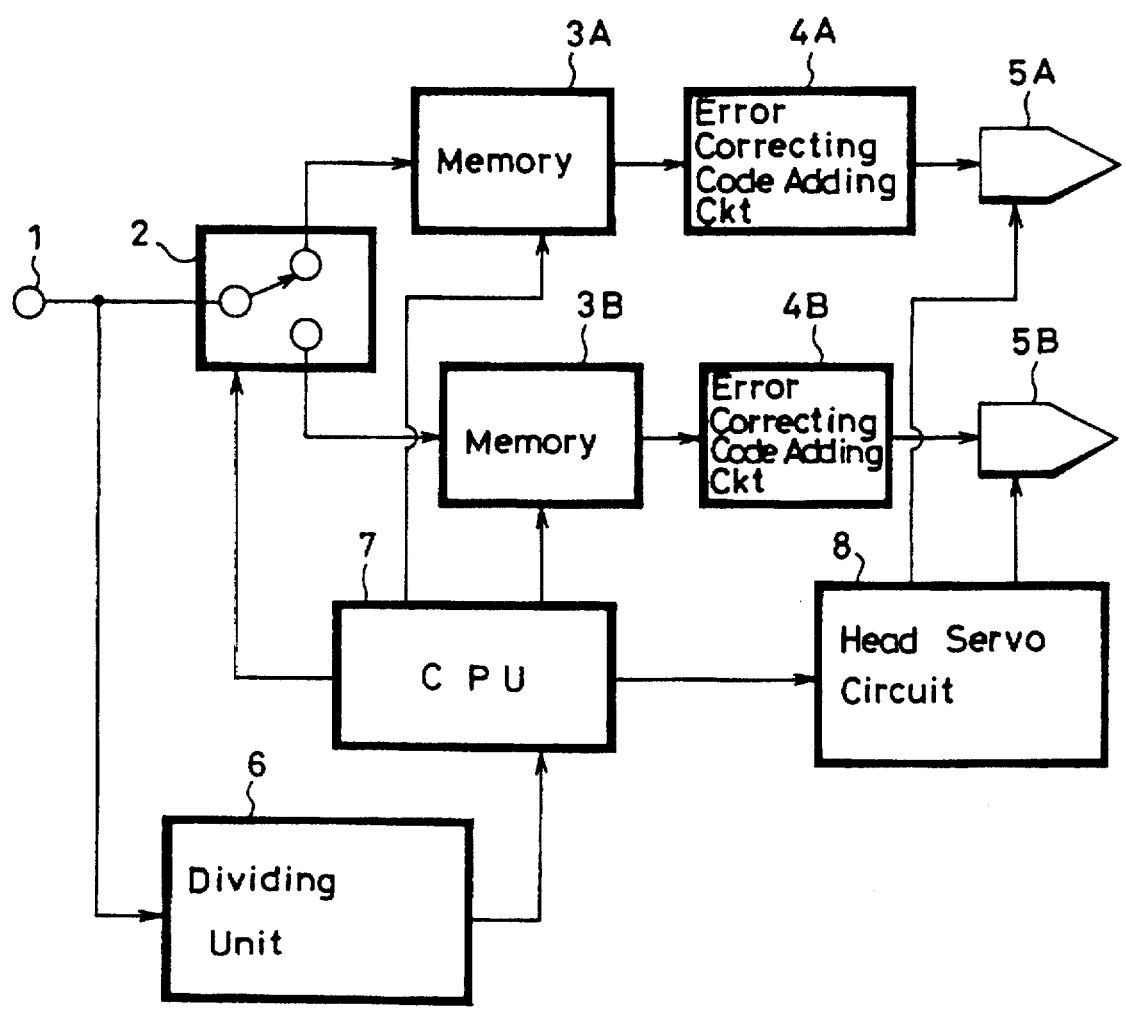
FIG. 2 is a block diagram of one embodiment of the recording apparatus in accordance with the present invention.

Turning now to FIG. 2, there is illustrated a block diagram of recording apparatus in accordance with the present invention. For simplification, the recording apparatus includes two recording heads 5A and 5B; but it will become apparent from the ensuing description that N recording heads may be used, wherein, $N \geq 2$. Heads 5A and 5B record data on a disk medium (not shown), such as a magnetic disk, an optical disk, a magneto-optic disk, or the like. The recording apparatus broadly is comprised of memory devices 3A and 3B, a dividing unit 6, a CPU 7 and a head servo circuit 8. Memory devices 3A and 3B are coupled to an input terminal 1 by way of a change-over switch 2. Successive bytes of data are supplied to input terminal 1 which also is coupled to dividing unit 6, as illustrated. The dividing unit is adapted to determine when a preset number of bytes have been received, this preset number constituting a data unit. As will be described, the size of a data unit, that is, the number of bytes included therein, is adaptable; and dividing unit 6 establishes the proper size of the data unit. The dividing unit is coupled to CPU 7 which, inter alia, is apprised of the reception of a data unit and operates to control switch 2 and to control the read and write operations of memory devices 3A and 3B. CPU 7 also is coupled to servo circuit 8 and controls the servo circuit to maintain heads 5A and 5B at proper tracks during recording operations and also to move the heads to desired tracks during seek operations.

The data written into memory devices 3A and 3B are read therefrom to heads 5A and 5B by error correcting code (ECC) circuits 4A and 4B, respectively. For example, inner and outer parity codes may be added to the data by ECC 4A and 4B; and the resultant data with the added error correcting codes are recorded by heads 5A and SB.

In operation, successive bytes of data are supplied to input terminal 1; and dividing unit 6 senses when DB bytes have been supplied. It is assumed that a data unit is formed of DB bytes. Initially, let it be assumed that switch 2 couples memory device 3A to input terminal 1. As an example, memory device 3A may be a buffer memory constructed as a first-in, first-out (FIFO) memory. CPU 7 controls the write operation of memory device 3A such that the successive data bytes supplied to input terminal 1 are written into the memory.

When dividing unit 6 senses the reception of DB bytes, a suitable indication thereof is supplied to CPU 7 which changes over switch 2 so as to couple memory device 3B to input terminal 1. CPU 7 now interrupts the write operation of memory device 3A and initiates a write operation for memory device 3B. Consequently, the successive data bytes supplied to input terminal 1 now are written into memory device 3B.

While the data bytes are written into memory device 3B, CPU 7 controls the read-out operation of memory device 3A; and the DB bytes stored in memory device 3A now are read out therefrom in succession. These successive bytes are processed by ECC circuit 4A, supplied to head 5A and recorded by the head. Similarly, after DB bytes are written into memory device 3B, CPU 7 changes over switch 2 and controls the read-out operation of memory device 3B such that the DB bytes stored therein now are read out as successive bytes, subjected to processing in ECC circuit 4B and recorded on the disk by head 5B. At this time, the next group of DB bytes that are received at input terminal 1 are written into memory device 3A. Thus, DB bytes are written alternately into memory device 3A and memory device 3B; and the bytes stored in the respective memory devices are read out to heads 5A and 5B, respectively, for recording. While one memory device has data bytes written therein, the other reads out to the recording head connected thereto data bytes that have been stored therein. Upon the receipt of DB bytes, the write/read operations of the respective memories are switched. Hence, the first group of DB bytes is written into memory 3A and then the next group is written into memory 3B while the preceding group is read from memory 3A. This alternating operation continues repeatedly. As a result, head 5 5A records DB bytes in a particular area, head 5B records the next DB bytes in another area, head 5A records the next-following DB bytes in yet another area, and so on. Preferably, heads 5A and 5B record the DB bytes supplied thereto in successive areas on the disk. As one example, such successive areas are adjacent each other, thereby forming a continuous record of the successive bytes supplied to input terminal 1.

As a feature of the present invention, the quantity of bytes referred to above as DB bytes constitutes a data unit. In one embodiment, each memory device 3A and 3B exhibits a memory capacity equal to a data unit. In another embodiment, each memory device is capable of storing several data units. Preferably, the input data bytes are divided into successive data units that are stored alternately in memory devices 3A and 3B. A data unit read from memory device 3A is supplied to and recorded by head 5A; and, similarly, a data unit read from memory device 3B is supplied to and recorded by head 5B. Thus, although each memory device may be capable of storing more than one data unit, it is preferable to read one data unit at a time therefrom, alternately, to heads 5A and 5B.

Figure 3:
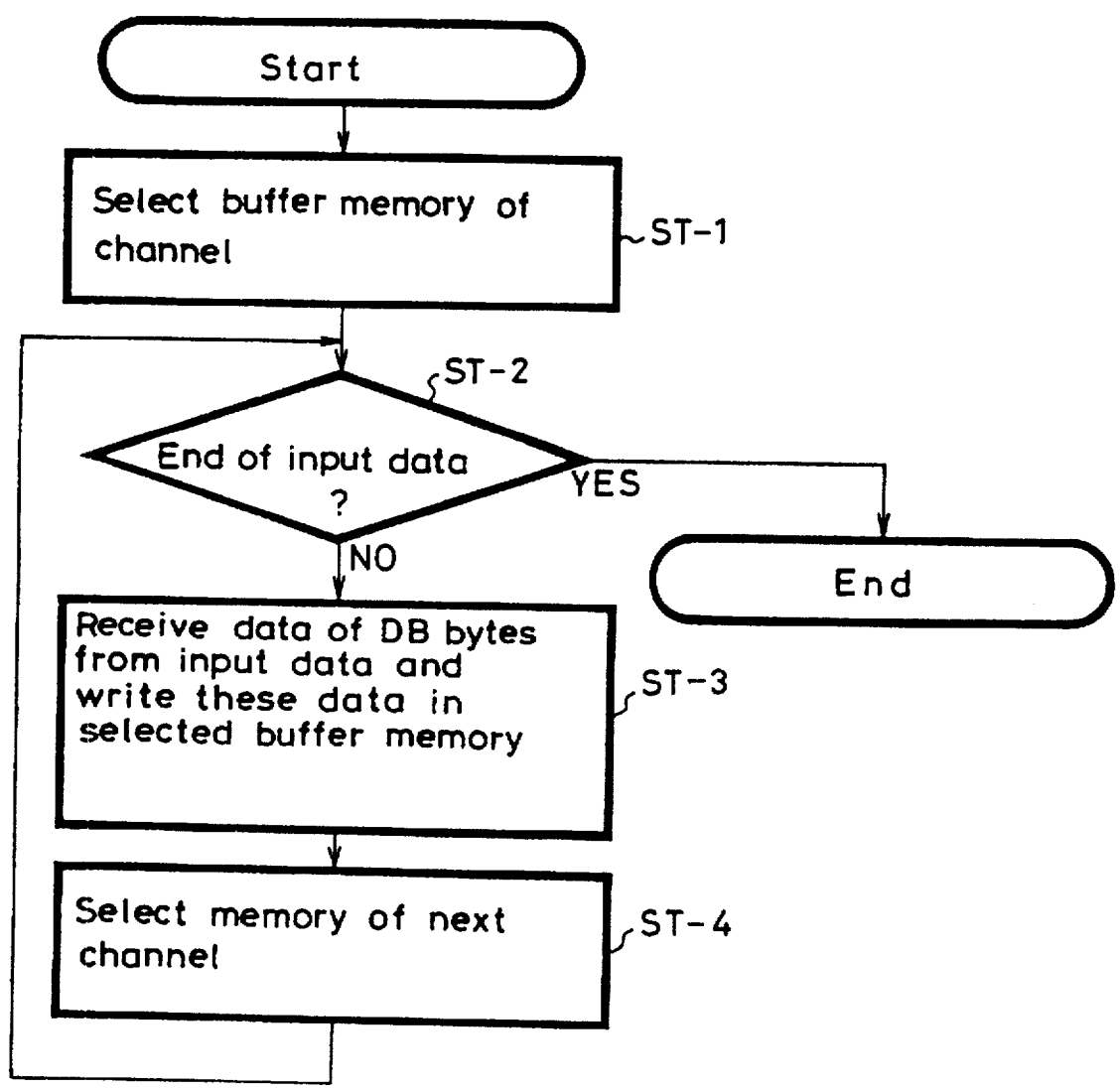
FIG. 3 is a flowchart which is useful in understanding the operation of the apparatus shown in FIG. 2.

The manner in which CPU 7 controls switch 2 to select memory device 3A or memory device 3B for writing thereinto a data unit DB now will be described in conjunction with the flowchart shown in FIG. 3. Initially, it is assumed that CPU 7 selects memory device 3A, as represented by instruction ST-1. The CPU then inquires at ST-2 whether all of the input data bytes that are to be recorded have been supplied to input terminal 1. If this inquiry is answered in the affirmative, the CPU terminate its routine. But, if input data bytes have yet to be recorded, inquiry ST-2 is answered in the negative and the CPU advances to instruction ST-3 whereby a data unit of DB successive bytes is written into the selected memory device (i.e. memory device 3A).

Instruction ST-3 is carried out until a complete data unit of DB bytes has been written into memory device 3A, where-upon the CPU advances to instruction ST-4 which selects the other memory device 3B. This selection is made by controlling switch 2 to couple memory device 3B to input terminal 1. The CPU then returns to inquiry ST-2 and the foregoing operation is repeated in connection with memory device 3B. It is appreciated, therefore, that memory devices 3A and 3B are selected alternately and repeatedly, whereby successive data units are written first into memory device 3A then into memory device 3B, then into memory device 3A, and so on.

Head 5A and head 5B record successive data bytes in successive sectors in respective areas on the disk. SB bytes are recorded in one sector and DS sectors are recorded in a respective area. A data unit formed of DB bytes is recorded across DS sectors. As an example, one sector records 1 k bytes (SB=1 k). If a data unit is comprised of DB bytes, then the total number of sectors that are used to record one data unit is DB/SB=DS sectors. It will be appreciated, therefore, that if LS sectors are used to record all of the input data bytes supplied to input terminal 1, and if SB bytes are recorded in one sector, then the total number of bytes that are recorded on the disk medium is LS×SB bytes. If a data unit is recorded in DS sectors, then LS/DS preferably is an integral number.

As mentioned above, when a data unit is written into memory device 3A, a different data unit is read from memory device 3B. Thus, when head 5B records the data unit read from memory device 3B, head 5A undergoes a seek operation to be positioned at the beginning of an area whereat the data unit that will be read from memory device 3A is written. The manner in which CPU 7 controls servo circuit 8 to effect this seek operation now will be described in conjunction with the flow chart shown in FIG. 4. Initially, this seek routine executes instruction ST-1, which sets the integer n, which may be considered an arbitrary integer, to 0 (n=0). The routine then advances to inquire at ST-2 if the number of sectors which accommodate a data unit, namely DS, multiplied by the factor 2n is ≧ the total number of sectors LS, which are provided for the recording of all of the input data. For example, LS may be the total number of sectors that are recorded on the disk medium. Stated mathematically, inquiry ST-2 determines if DS×2n≧LS. If this inquiry is answered in the affirmative, thereby indicating that head 5A is being driven to a location beyond the area in which the last data unit had been recorded, the seek routine terminates.

But, if inquiry ST-2 is answered in the negative, meaning that all of the input data bytes have not yet been recorded, the routine advances to instruction ST-3 whereby head 5A is driven to seek sector BS+DS×2n. Here, BS identifies the first sector in a respective area for recording the beginning portion of a data unit. In the present example, since n=0, head 5A is driven to seek sector BS. Once the head is positioned at this sector, data bytes read from memory device 3A are recorded from this sector BS+DS×2n to sector BS+DS×(2n+1)−1, as represented by instruction ST-4. Hence, consistent with the present example wherein n=0, the data bytes read from memory device 3A are recorded by head 5A from sector BS to sector BS+DS−1. It will be appreciated, therefore, that a data unit is recorded in these successive sectors in a respective area on the disk medium. After data bytes are recorded in this last sector BS+DS−1, the routine advances to instruction ST-5 and the integer n is incremented by 1 (n=n+1). The routine then returns to inquiry ST-2 and the foregoing operation is repeated.

Returning to ST-2, inquiry is made as to whether the number of sectors that have been recorded exceeds the total number of sectors which are provided for recording the input data. That is, inquiry is made to determine if DS×2n≧LS. In the present example, inquiry ST-2 determines if DS×2≧LS. It is expected that this inquiry is answered in the negative; and the routine advances to instruction ST-3, whereupon head 5A is driven to seek sector BS+DS×2n. Again, consistent with this example, the head is driven to seek sector BS+2DS. It will be appreciated, particularly from the forthcoming discussion of the flow chart shown in FIG. 5 and the schematic representation of FIG. 6, that head 5A jumps across an area equal to DS sectors in order to arrive at this location. That is, head 5A had last recorded data bytes from sector BS to sector BS+DS−1 and jumps from sector BS+DS to sector BS+2DS. As will be described, the area over which head 5A jumps is used by head 5B to record data bytes read from memory device 3B.

When sector BS+2DS is reached, the routine advances to instruction ST-4 to record data bytes read from memory device 3A from this sector BS+DS to sector BS+3DS−1. Stated broadly, and as shown in instruction ST-4, a data unit now is recorded from sector BS+DS×2n to sector BS+DS×(2n+1)−1. Once this last sector is recorded, instruction ST-5 is executed and the integer n is incremented such that n=2. The foregoing operation then is repeated.

Figure 5:
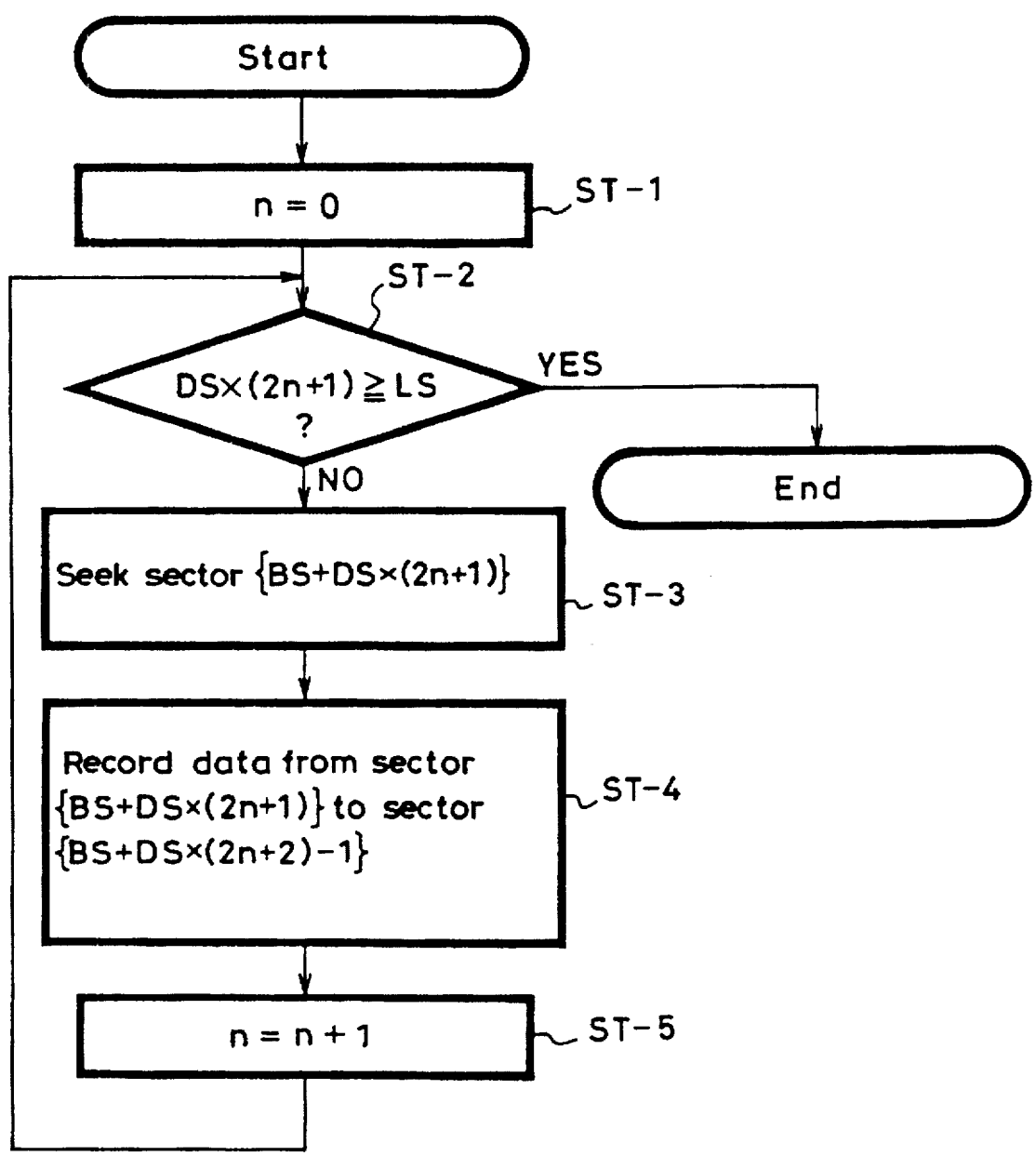

CPU 7 controls head 5B to execute a similar seek and record operation, as represented by the flow chart shown in FIG. 5. Initially, the integer n is set to 0 (n=0) at instruction ST-1. Then, the routine advances to inquire at ST-2 if head 5B now is prepared to record a sector which exceeds the number of sectors LS that have been allocated to record all of the input data. That is, inquiry ST-2 determines if DS×(2n+1)≧LS. In the present example, n=0; and inquiry ST-2 determines if DS≧LS. When inquiry ST-2 is answered in the affirmative, the seek and record routine carried out by CPU 7 terminates. However, in the present example, inquiry ST-2 is answered in the negative; and the routine advances to instruction ST-3.

By this instruction, the CPU controls servo circuit 8 to drive head 5B to seek sector BS+DS×(2n+1). In the present example, head 5B is driven to sector BS+DS. It will be recalled from the flow chart shown in FIG. 4 that, prior to this operation, head 5A had recorded data bytes up to sector BS+DS−1. Hence, instruction ST-3 in FIG. 5 advances head 5B to the next sector, namely, BS+DS. Then, the routine advances to instruction ST-4, whereby the successive data bytes read from memory device 3B are recorded by head 5B from this beginning sector BS+DS up until sector BS+2DS−1. In more general terms, instruction ST-4 controls head 5B to record data bytes from sector BS+DS×(2n+1) to sector BS+DS×(2n+2)−1. Of course, it has been assumed that, in the present example, n=0.

After the data bytes have been recorded in sector BS+2DS−1, the routine advances to instruction ST-5, whereby the integer n is incremented (n=1). Then, the routine returns to inquiry ST-2 and the foregoing operation is repeated.

Figure 4:
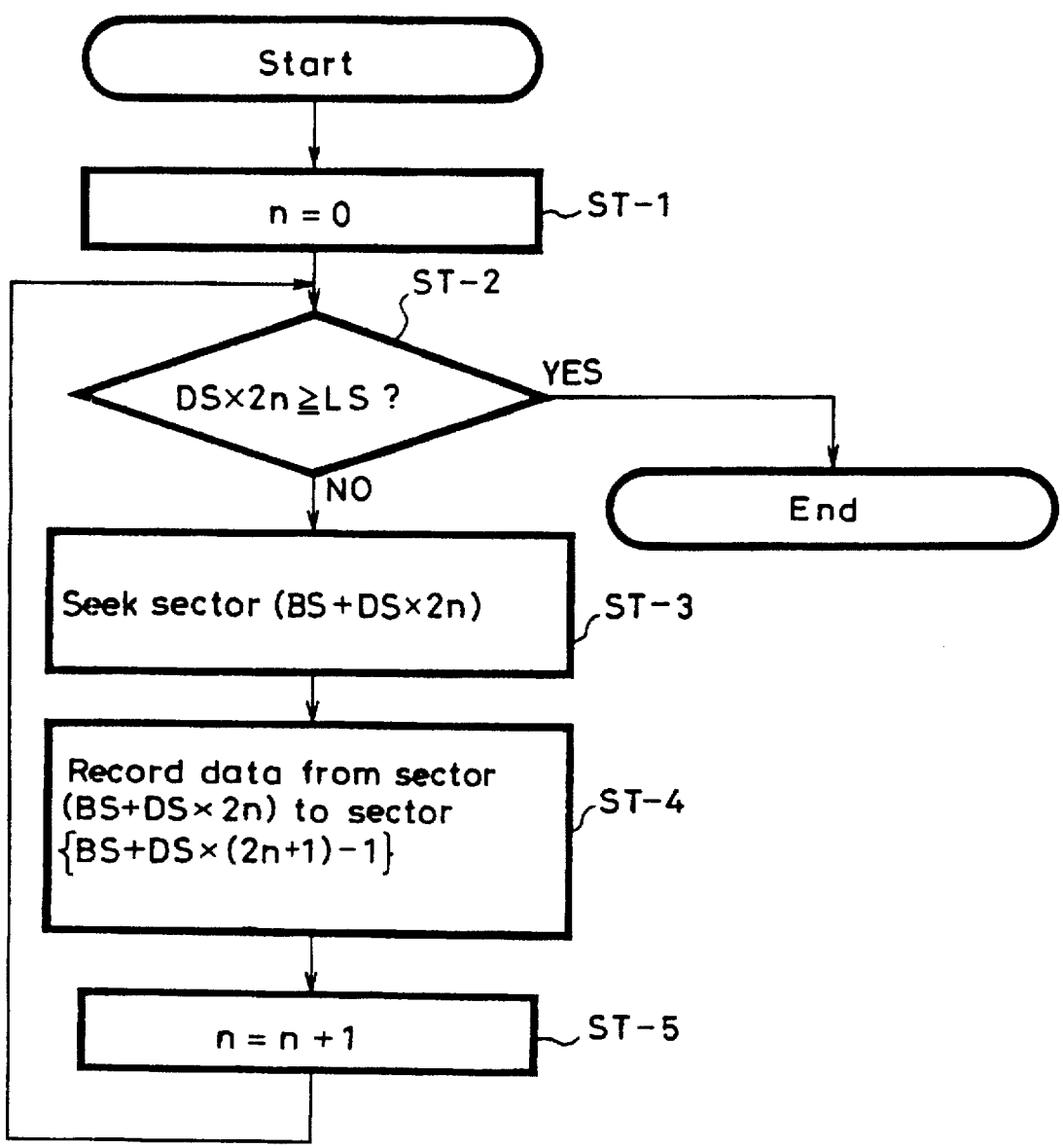
FIGS. 4 and 5 are flowcharts which are helpful in understanding the manner in which the apparatus shown in FIG. 2 records data.

It will be appreciated that the seek and record routines represented by the flow charts shown in FIGS. 4 and 5 alternate. That is, while head 5A seeks sector BS+DS×2n, head 5B records a data unit from sector BS+DS×(2n+1) to sector BS+DS×(2n+2)−1. Then, after head 5B records the last data byte in sector BS+DS×(2n+2)−1, head 5A records a data unit from sector BS+DS×2n to sector BS+DS×(2n+1)−1, while head 5B is driven to seek sector BS+DS×(2+1). The alternating seek and record routines are carried out until the last sector LS for recording the input data is recorded. That is, the seek and record routines terminate when DS×2n≧LS or DS×(2+1)≧LS.

Figure 6:
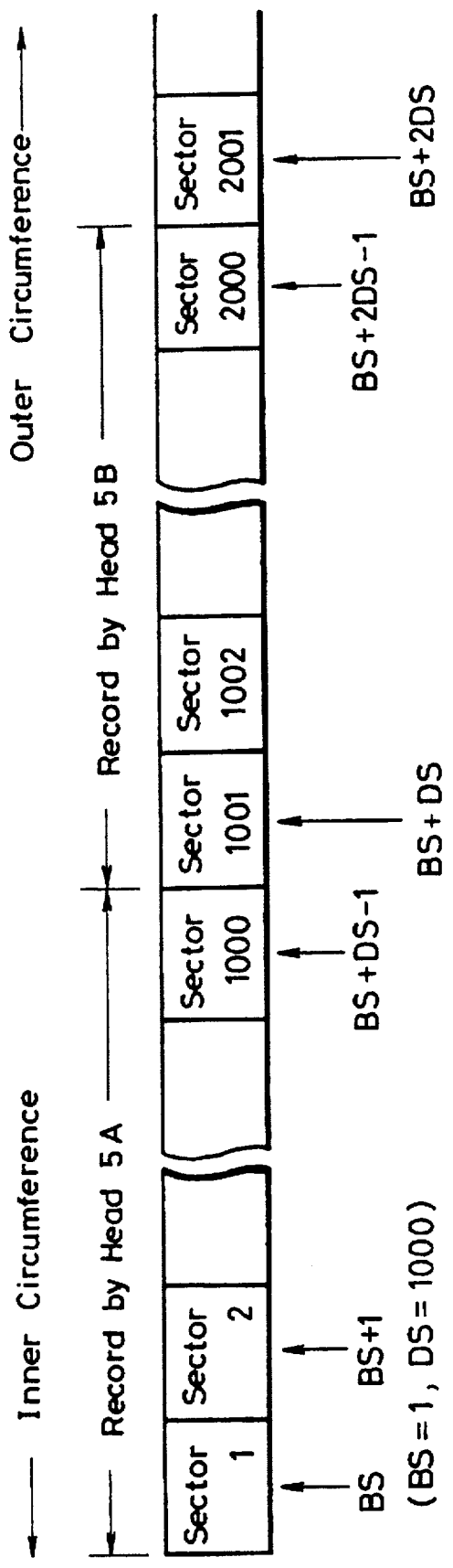
FIG. 6 is a schematic representation of the format by which the apparatus shown in FIG. 2 records data.

The seek and record operations carried out by heads 5A and 5B result in the recording of successive sectors in successive areas as shown schematically in FIG. 6. It is assumed that the heads record in successive tracks, or in a spiral track, from an inner track to an outer track (that is, from the inner circumference to the outer circumference) of the disk. For convenience and simplification, the beginning sector BS at which the recording of a data unit commences is assumed to be 1 (BS=1). It is further assumed that a data unit is recorded in DS sectors, wherein DS=1000. Thus, head 5A records 1000 sectors in a respective area and head 5B records 1000 sectors in the next-following area. Then, head 5A records the next 1000 sectors, followed by the recording by head 5B of the next-following 1000 sectors, and so on. Consistent with the flow charts discussed above, head 5A records successive data bytes in sector 1, sector 2, sector 3 . . . sector 1000; and then head 5B records successive data bytes in sector 1001, sector 1002, . . . sector 2000. Thereafter, head 5A records successive data bytes in sector 2001, sector 2002 . . . sector 3000; followed by head 5B which records successive data bytes in sector 3001, sector 3002 . . . sector 4000.

Figure 7:
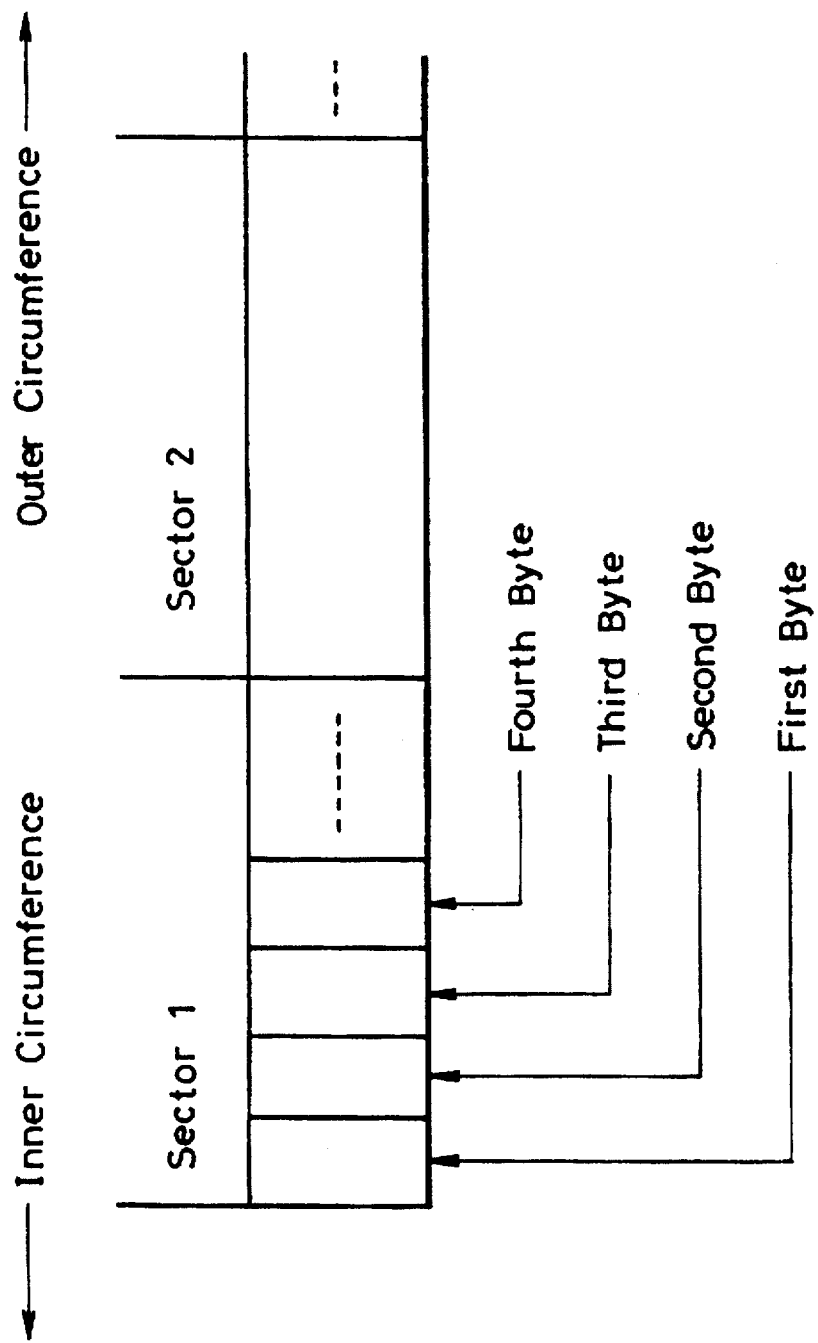
FIG. 7 is an enlarged representation of the sectors shown in FIG. 6.

Turning to FIG. 7, there is a schematic illustration of the recording of data bytes in each sector. For example, in sector 1, head 5A records byte 1 followed by byte 2, followed by byte 3, and so on.

Assuming that 1 k bytes are recorded in one sector, and further assuming a data unit is recorded in 1000 sectors, it is seen that a data unit is formed of 1 million bytes recorded successively from sector 1 to sector 1000. Head 5B then records byte 1,000,001 to byte 2,000,000 in successive sectors 1001, 1002, . . . 2000.

Consequently, the input data bytes which are supplied successively to input terminal 1 are recorded in a pattern, or format, quite similar to the pattern formed by continuously recording input data bytes by a single head.

Here, however, two heads are used to record the input data, thereby increasing the transfer rate at which the data is recorded. It will be appreciated that if a greater number of heads are used for recording the input data, for example, if three or more heads are used, the recording transfer rate is increased by a corresponding factor. Advantageously, since the recorded data pattern is quite similar to the pattern formed by the continuous recording of input data by a single head, the data recorded by heads 5A and 5B nevertheless can be reproduced at a high speed by a single head.

When a single head is used, sectors 1, 2, . . . 1000, 1001, 1002, . . . 2000, 2001, . . . are read successively, and there is no need for a single head to jump from one area to another. Consequently, the seek time needed for reproducing the data recorded by heads 5A and SB is minimized.

On the other hand, if two or more heads are used to reproduce the data recorded by heads 5A and 5B, the playback speed may be increased by a factor determined by the number of playback heads. This will be described in greater detail below. A reduction ratio K of the transfer rate attributed to a seek operation may be defined as:

$$K=(DB/R)/[(DB/R)+SK]$$

where DB is the number of bytes included in a data unit, R is the transfer rate of one head in bytes/sec., and SK is the time required for the head to perform a seek operation, namely, the time needed to rotate the disk by one full rotation. As a numerical example:

DB=1M bytes
R=5M bytes/sec.
SK=0.025 sec.

When these values are substituted into the aforementioned equation, the reduction ratio K of the transfer rate is approximately 0.9. Stated otherwise, the transfer rate is reduced by about 10% because of the seek operation.

The manner in which dividing unit 6 divides the input data bytes into data units, with each data unit being formed of DB bytes, now will be described in conjunction with the flow chart shown in FIG. 8.

Let it be assumed that the total number of input data bytes to be recorded on the disk medium is IB bytes.

Let it be further assumed that the storage capacity of each memory device 3A and 3B is BB bytes.

Consistent with the foregoing description, it is assumed that the number of bytes recorded in one sector is SB bytes. Now, the adaptability of dividing the input bytes into data units is demonstrated by the flow chart of FIG. 8, wherein the routine carried out by the dividing unit (which may be a processor) commences with inquiry ST-1. This inquiry determines if half the total number of input bytes to be recorded on the disk medium exceeds the memory capacity. That is, inquiry ST-1 determines if (IB/2)>BB. If this inquiry is answered in the affirmative, the routine advances to instruction ST-2, where the data unit DB is set equal to the memory capacity BB. However, if inquiry ST-1 is answered in the negative, the routine advances to instruction ST-3 and the data unit DB is set equal to IB/2, or half the total number of data bytes to be recorded.

Then, once the size of the data unit has been set, the routine advances to instruction ST-4 to determine the number of sectors DS in which a data unit is to be recorded. That is, as a result of instruction ST-4, DS=DB/SB.

It is seen that, consistent with this dividing operation, if the total number of input bytes to be recorded is large, the size of a data unit is limited to the memory capacity of the memory device into which the data unit is written. However, if the number of data bytes to be recorded on the disk medium is relatively small, the size of the data unit is set to be half the total number of input data bytes. As a result, the recording transfer rate may be increased by this adaptable sizing of the data unit.

In the foregoing description, it has been assumed that the total number of sectors in which all of the input data is recorded is an integral multiple of the number of sectors DS in which a data unit is recorded. However, the total number of sectors to be recorded might not be an integral multiple of the number of sectors in which a data unit is recorded. Consequently, after an integral number of data units has been recorded, a number of data bytes less than a data unit may remain in memory device 3A or 3B. Nevertheless, these remaining bytes are recorded in a number of sectors, even though such sectors may be less than the number of sectors that accommodate the data unit.

Figure 9:
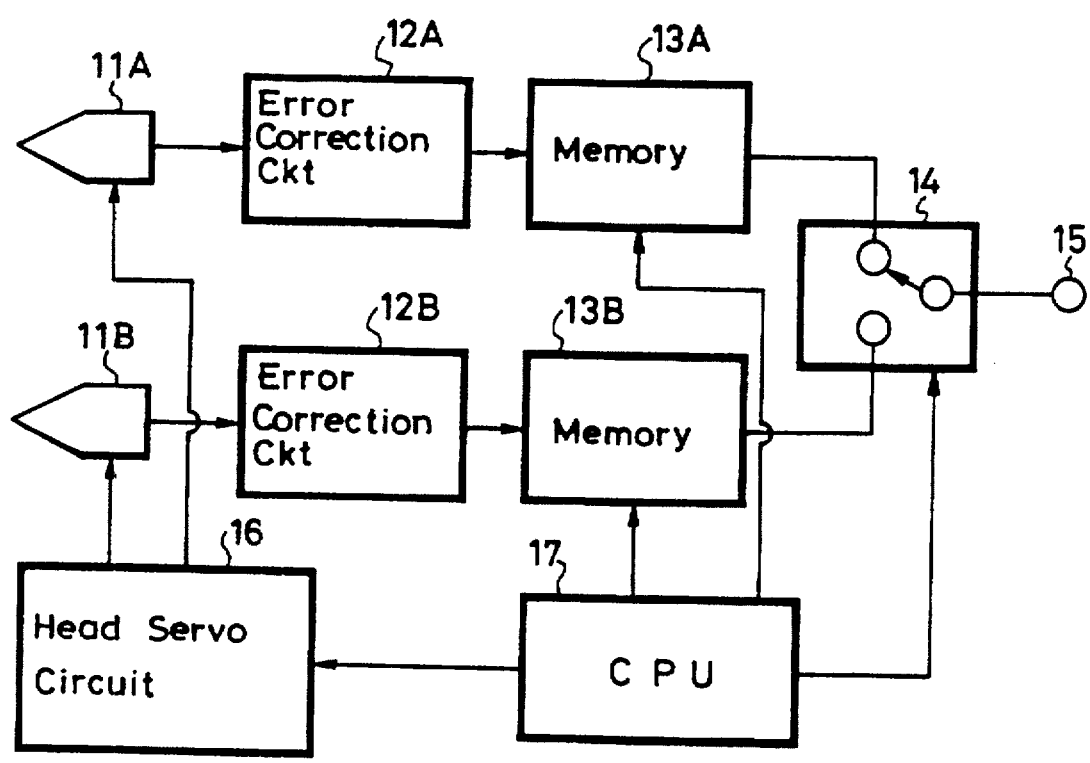
FIG. 9 is a block diagram of reproducing apparatus in accordance with the present invention.

A block diagram of the reproducing apparatus in accordance with the present invention is illustrated in FIG. 9. It will be appreciated that the illustrated reproducing apparatus essentially is a "mirror image" of the recording apparatus shown in FIG. 2. Consistent with the example discussed in conjunction with FIG. 2, the illustrated reproducing apparatus is provided with two playback heads 11A and 11B; but it will be appreciated that N playback heads may be used, wherein N≧2. The reproducing apparatus of the present invention is readily adapted to play back data that is recorded in a continuous format, either by the recording apparatus shown in FIG. 2 or by a single recording head. It is appreciated that the data bytes to be reproduced are recorded in successive areas, with each area containing several sectors and with each sector having several bytes recorded therein. This continuous data format has been discussed above in connection with the schematic representations of FIGS. 6 and 7.

The reproducing apparatus is comprised of playback heads 11A and 11B, memory devices 13A and 13B, a head servo circuit 16 and a CPU 17. It will be appreciated that heads 11A and 11B may be the same heads as are used for recording; and, likewise, the memory devices, head servo circuit and CPU which are provided for the recording apparatus also may be used for reproduction. Heads 11A and 11B are coupled to memory devices 13A and 13B by error correction circuits (ECC circuits) 12A and 12B, respectively. An output terminal 15 is coupled to both of the memory devices by way of a change-over switch 14 which, in turn, is controlled by CPU 17. The CPU also controls the write and read operations of memory devices 13A and 13B, thereby coordinating the switching and read/write operations such that a data unit stored in one memory device is read out therefrom to output terminal 15 by way of switch 14 while, at the same time, A data unit is written into the other memory device. CPU 17 also is coupled to head servo circuit 16 to control the servo circuit so as to maintain heads 11A and 11B at the proper tracks during a playback operation and also to move the heads to desired tracks during seek operations.

In operation, head 11A reproduces data bytes from one area on the disk medium while head 11B seeks another area to prepare to read the data that had been recorded in that other area. Head servo circuit 16 controls the tracking and seeking operations of the respective heads in a manner known to those of ordinary skill in the art.

The successive data bytes read from successive sectors in a given area by head 11A are written into memory device 13A via ECC circuit 12A. As is known, the ECC circuit senses and corrects errors that may be present in the reproduced data. Once a data unit is stored in memory device 13A, CPU 17 effects a read-out operation such that the data unit is coupled to output terminal 15 via switch 14 byte by byte.

While a data unit is being written into memory device 13A from head 11A, head 11B is driven to the area where the next data unit is recorded. Preferably, the area to which head 11B is driven follows the area presently being read by head 11A. For example, these successive areas may constitute successive tracks on the disk medium. It is expected that head 11B arrives at the next area from which data is to be read while bytes are being written into (or read from) memory device 13A. Successive data bytes recorded in successive sectors in this next area are read therefrom by head 11B and written into memory device 13B via ECC circuit 12B. CPU 17 operates switch 14 to couple memory device 13B to output terminal 15 after a data unit has been read from memory device 13A, thereby enabling the data unit now stored in memory device 13B to be read out to the output terminal.

While memory device 13B undergoes a write/read operation, head 11A seeks the next area from which data is reproduced. Thus, heads 11A and 11B operate alternately to seek and recover previously recorded data; and, likewise, memory devices 13A and 13B operate alternately to have data written therein and then read therefrom. Like memory devices 3A and 3B, memory devices 13A and 13B may comprise FIFO buffer memories.

As will be described, the data unit used for reproduction need not be the same as the data unit used for recording; that is, the data unit used for reproduction may be formed of a lesser number of sectors than the data unit used for recording. This provides flexibility in the reproducing apparatus because such apparatus need not be used solely with disk media that are recorded by the recording apparatus of FIG. 2. That is, the reproducing apparatus shown in FIG. 9 is compatible not only with the recording apparatus of FIG. 2 but also with disk media that are recorded by, for example, a single recording head or by multiple recording heads. Stated otherwise, the DB bytes which form the data unit for purposes of reproduction need not be equal to the DB bytes that constitute the data unit during recording.

Figure 10:
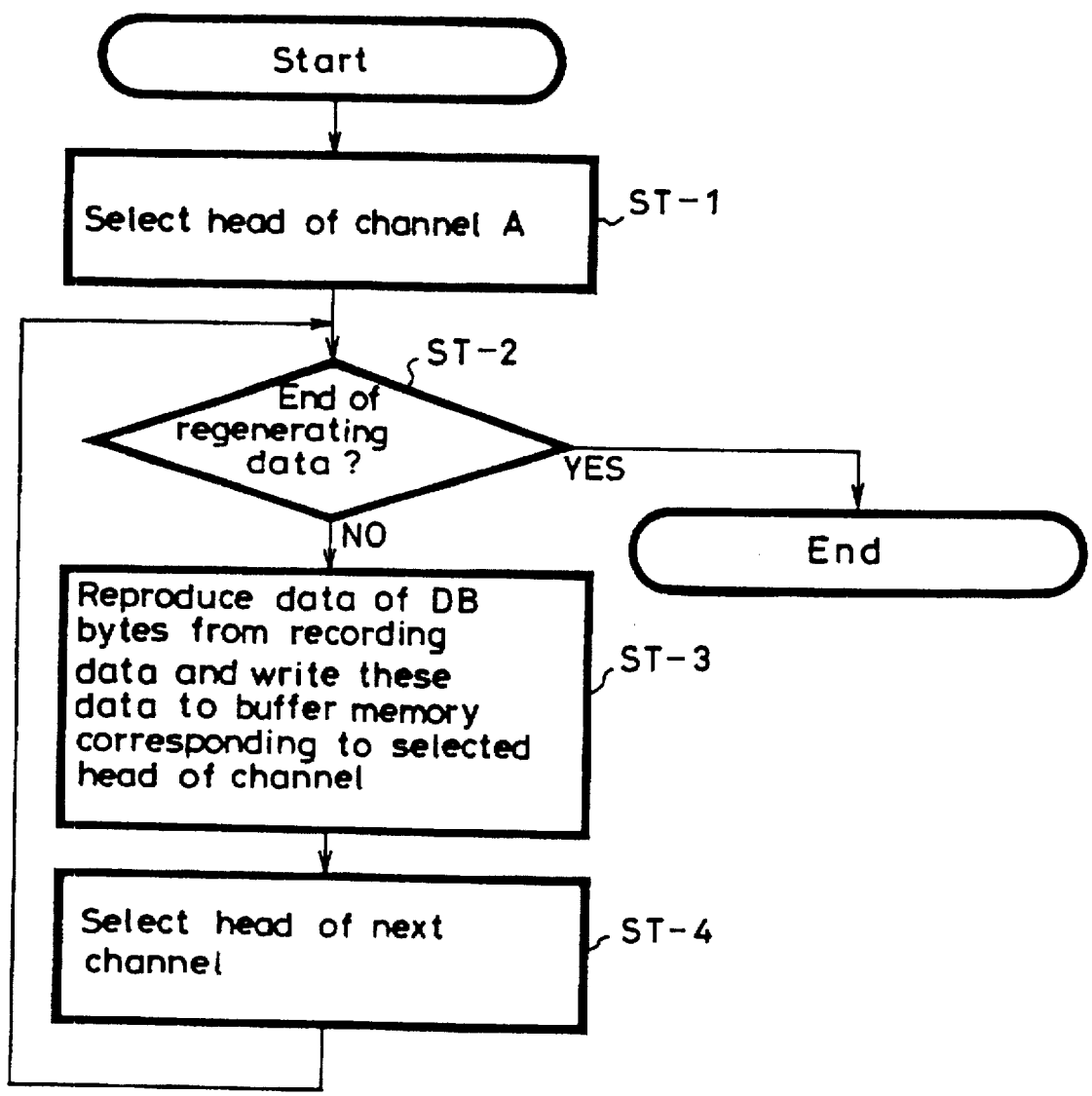
FIG. 10 is a flowchart which is useful in understanding the manner in which the apparatus shown in FIG. 9 operates.

The manner in which CPU 17 controls the read/write operations of memory devices 13A and 13B and also controls the state of change-over switch 14 now will be described in conjunction with the flowchart shown in FIG. 10.

Initially, it is assumed that CPU 17 selects head 11A to reproduce data from the disk medium. Thus, memory device 13A is controlled to carry out a write operation. The selection of head 11A is effected at instruction ST-1, whereafter the CPU advances to inquire, at ST-2, if all of the data that had been recorded on the disk medium had been reproduced. If this inquiry is answered in the affirmative, the CPU terminates its routine but, if previously recorded data has yet to be reproduced, inquiry ST-2 is answered in the negative and the CPU advances to instruction ST-3 whereby a data unit of DB successive bytes is written into the memory device that is connected to the selected head. That is, in the present operation, the data unit of DB bytes reproduced by head 11A is written into memory device 13A.

Instruction ST-3 is carried out until a completed data unit of DB bytes has been written into memory device 13A, whereupon the CPU advances to instruction ST-4 which selects the other head 11B to reproduce the previously recorded data. The CPU then returns to inquiry ST-2 and the foregoing operation is repeated in connection with head 11B and memory device 13B. It is appreciated, therefore, that heads 11A and 11B are selected alternately and repeatedly, whereby successive data units are written first into memory device 13A, then into memory device 13B, then into memory device 13A, and so on.

Figure 13:
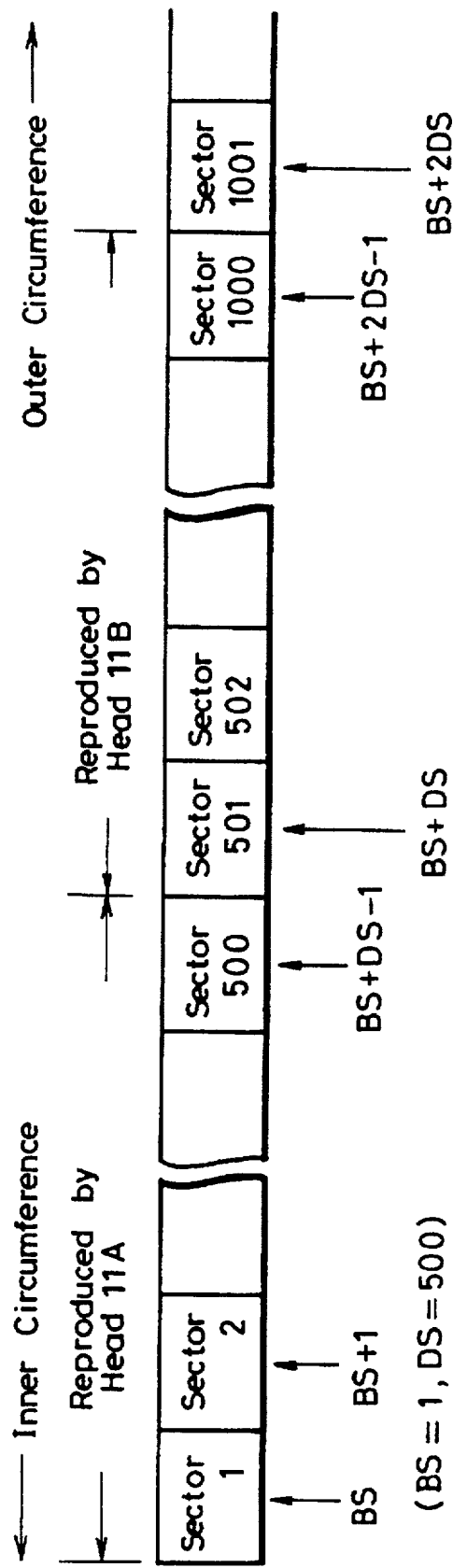
FIG. 13 schematically represents the format of the recorded data that is reproduced by the apparatus shown in FIG. 9.

To demonstrate the flexibility of the reproducing apparatus in accordance with the present invention, let it be assumed that heads 11A and 11B reproduce data that had been recorded in accordance with the format shown in FIG. 13. It will be appreciated that this format is quite similar to the recording format shown in FIG. 6, except the number of sectors which accommodate a data unit in FIG. 13 is less than the number of sectors in which a data unit is recorded in FIG. 6. If it is assumed that SB bytes are recorded in each sector (SB may be about 1 kB) the number of sectors DS which accommodate a data unit is DS=DB/SB where DB is the number of bytes included in the data unit.

CPU 17 controls servo circuit 16 to cause head 11A to reproduce the proper number of bytes in a data unit while driving head 11B to the first sector of the next data unit to be reproduced from the disk medium. The manner in which the CPU controls the servo circuit to drive the respective heads, such that each head alternately seeks and reproduces the previously recorded data, now will be described in connection with the flowcharts of FIGS. 11–12.

Figure 11:
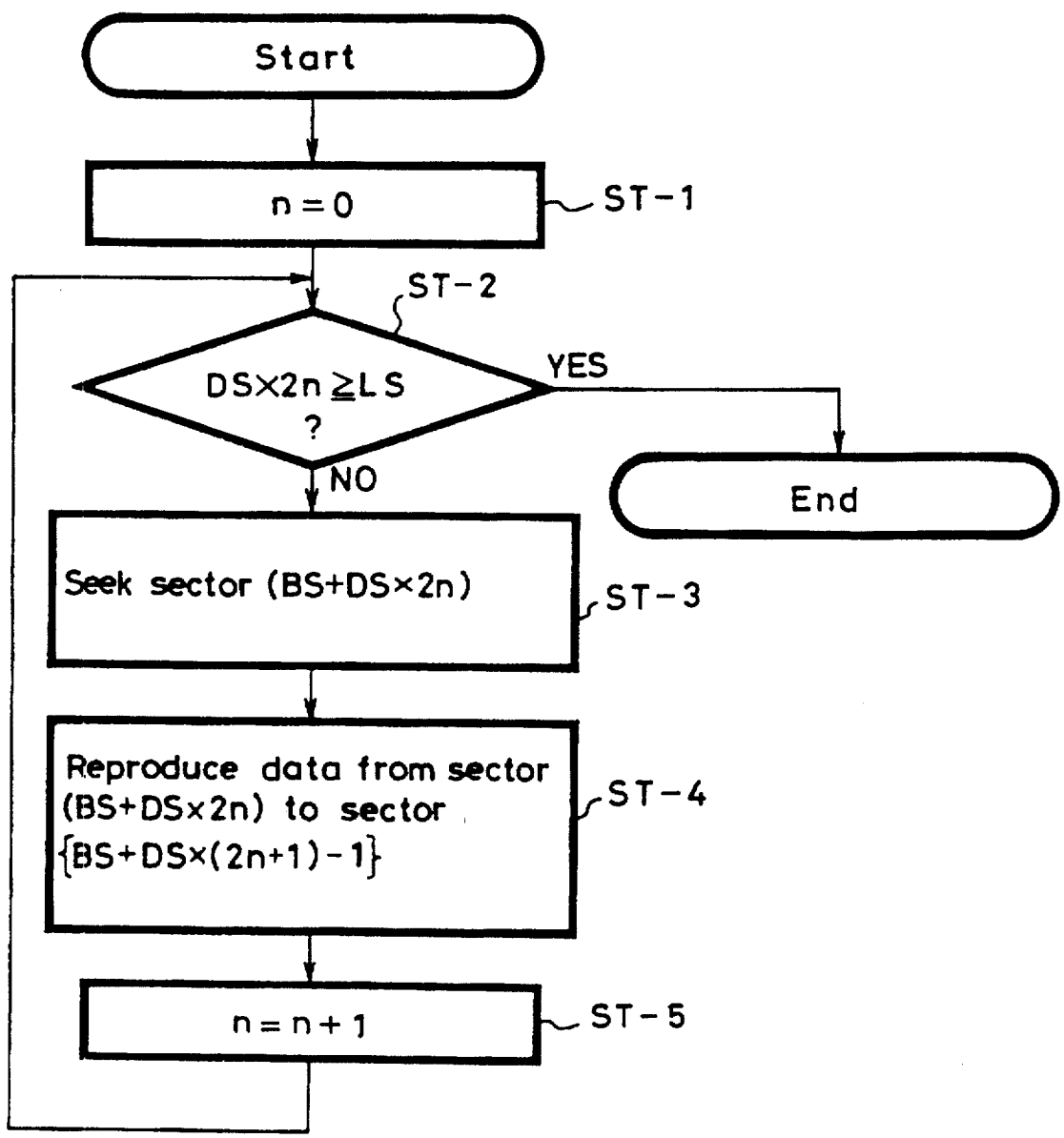

FIG. 11 illustrates the flowchart by which the CPU controls head 11A. Initially, CPU executes instruction ST-1 of FIG. 11, which sets the integer n to 0 (n=0). The routine performed by the CPU then advances to inquire at ST-2 if the number of sectors which accommodate a data unit, namely DS, multiplied by the factor 2n is greater than or equal to the total number of sectors LS in which all of the data is recorded on the disk medium. That is, inquiry ST-2 determines if DS×2n≧LS. An affirmative answer to this inquiry means that all of the recorded sectors have been reproduced and the CPU simply terminates its routine.

But, if inquiry ST-2 is answered in the negative, meaning that all of the recorded data bytes have not yet been reproduced, the CPU advances to instruction ST-3 where head 11A is driven to seek sector BS+DS×2n. Here, BS identifies the first sector in which the beginning portion of a data unit is recorded. In the present example, since n=0, head 11A is driven to seek sector BS.

Once the head is positioned at sector BS, the CPU advances to instruction ST-4 to reproduce successive bytes from this sector and from the next successive DS−1 sectors. That is, head 11A reproduces the data from sector BS+DS× 2n to sector BS+DS×(2n+1)−1. In this example, however, n=0 and, thus, head 11A reproduces successive data bytes from sector BS to sector BS+DS−1. Since a data unit is recorded in these DS sectors, instruction ST-4 effects the reproduction of a complete data unit from such DS sectors. After the data unit is reproduced, the routine advances to instruction ST-5 to increment the integer n (n =n+1); and the routine then returns to inquiry ST-2 to repeat the foregoing operation.

The routine depicted by the flowchart shown in FIG. 11 may be thought of as controlling head 11A to reproduce data units from even numbered areas and to skip over odd numbered areas. As will be described now in conjunction with the flowchart shown in FIG. 12, the CPU controls head 11B to reproduce data units from the odd numbered areas and to skip over the even numbered areas. Turning to FIG. 12, the CPU commences the seek routine for head 11B at instruction ST-1 where the integer n is set to 0 (n=0). Then, the routine advances to inquire at ST-2 if, with this setting of n, all of the sectors which had been recorded have, in fact, been reproduced. That is, inquiry ST-2 determines if DS× (2n+1)≧LS. If so, CPU 17 simply terminates this seek routine because there no longer are any sectors of data to be recovered. In the present example, this inquiry is answered in the negative; and the routine advances to instruction ST-3.

Instruction ST-3 controls servo circuit 16 to drive head 11B to seek sector BS+DS×(2n+1). In the present example, n =0, and head 11B is driven to seek sector BS+DS. It will be recalled from the flowchart of FIG. 11 that, prior to this operation, head 11A had reproduced data bytes up to sector BS+DS−1. Hence, instruction ST-3 in FIG. 12 advances head 11B to the next successive sector, namely sector BS+DS in the next-following area on the disk medium. Then, the routine advances to instruction ST -4, whereby the successive data bytes from sector BS+DS×(2n+1) to sector BS+DS×(2n+2)−1 are recovered. In the present example, n=0, and successive bytes are recovered from sector BS+DS to sector BS+2DS−1.

After the data bytes which constitute a data unit have been reproduced, that is, after the last data byte in sector BS+2DS−1 has been recovered, the routine advances to instruction ST-5, whereby the integer n is incremented (n=1). The routine then returns to inquiry ST-2 and the foregoing operation is repeated.

The foregoing alternate seek and recover operations carried out by heads 11A and 11B are best appreciated by referring to the schematic diagram of FIG. 13. As mentioned above, FIG. 13, which represents the continuous data format played back by the apparatus shown in FIG. 9, differs from the continuous data format shown in FIG. 6 in that a data unit is recorded in 500 sectors, rather than the 1000 sectors shown in FIG. 6. It is seen, then, that head 11A initially is driven to sector 1 (BS=1) and reproduces the successive data bytes stored in sector 1, sector 2 . . . sector 500. While head 11A is reproducing the data bytes from these sectors, head 11B is driven to sector 501 (BS+DS=501); and after the last data byte is reproduced from sector 500 by head 11A, head 11B begins to reproduce the successive data bytes from sector 501, sector 502 . . . sector 1000. While head 11B is reproducing data bytes, head 11A is driven to sector 1001 (BS+2DS=1001); and after the last data byte is recovered from sector 1000 by head 11B, head 11A reproduces successive bytes from sector 1001, sector 1002 . . . sector 1500.

Thus, as heads 11A and 11B alternately recover data units from the sectors which exhibit the continuous data format shown in FIG. 13. While one head reproduces data from a respective data area, the other head is driven to the next data area in preparation for reproducing data therefrom. Such alternating seek and recover operations thus reproduce continuous data, and it is unimportant to the reproducing operation if the data had been recorded by a single head or by two or more heads.

The manner in which the size of a data unit is determined by CPU 17 in the reproducing apparatus shown in FIG. 9 is practically identical to the manner in which the size of a data unit is determined by CPU 7 in the recording apparatus. FIG. 8 is a flow chart which represents the routine performed by CPU 17; and since this flow chart has been discussed above, further duplicative description is not provided. Nevertheless, it will be appreciated that, depending upon the amount of data that has been recorded, namely the value of IB relative to the storage capacity BB of each of memory devices 13A and 13B, the number of sectors DS in which a data unit is assumed to be recorded is either BB/SB or IB/2SB. As was the case during the recording operation, if the total number of recorded bytes is large, the size of a data unit is limited to the memory capacity of the memory device into which the data unit is written. However, if the number of recorded data bytes is relatively small, the size of the data unit is set to be half the total number of recorded bytes. As a result, the playback speed can be increased by this adaptable sizing of the data unit.

Figure 8:
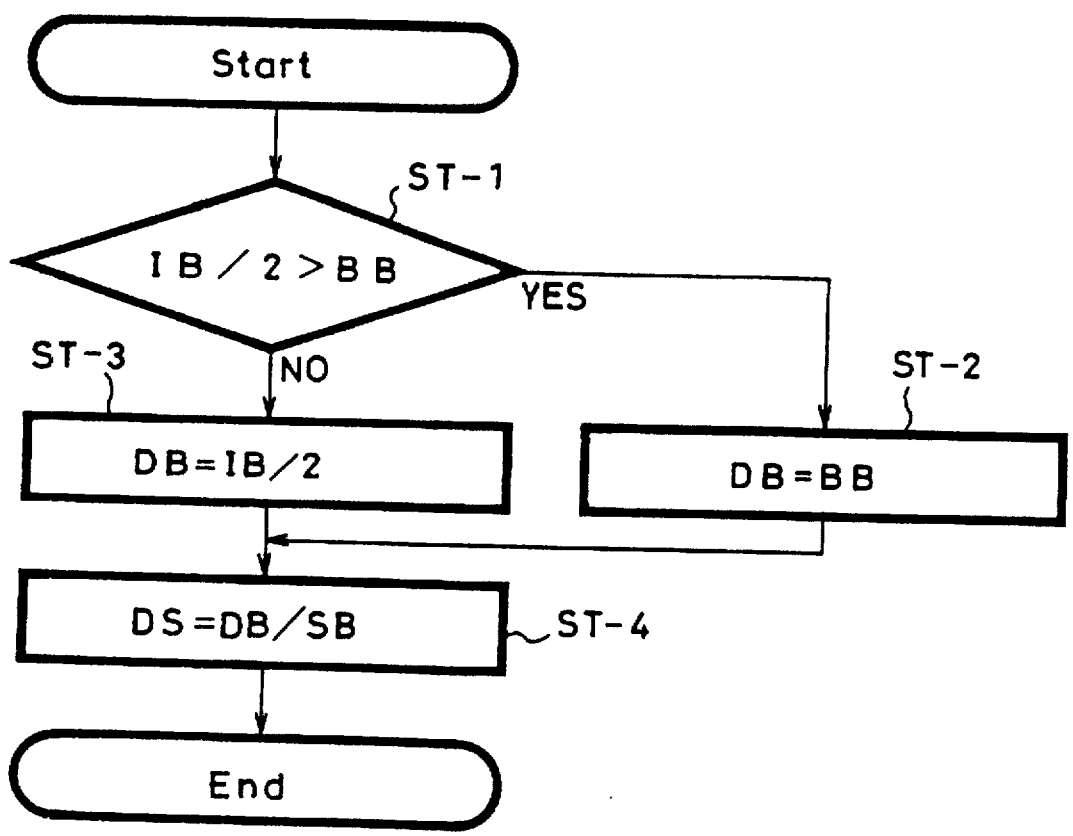
FIG. 8 is a flowchart which is useful in understanding the manner in which the size of a data unit is determined by the present invention.

In determining the size of a data unit for the recording apparatus as well as for the reproducing apparatus, as represented by the flow chart shown in FIG. 8, it has been assumed that two heads and two memory devices are used for recording and two heads and two memory devices are used for reproduction. More generally, however, if N heads and N memory devices are used, the data unit formed of DB bytes may be IB/N if (IB/N)≧BB; and the number of bytes DB in a data unit may be DB=BB when (IB/N)>BB.

While the present invention has been particularly shown and described with reference to preferred embodiments, it will be readily appreciated by those of ordinary skill in the art that various changes may be made without departing from the spirit and scope of the invention. For example, physically separate memory devices may be used as memory devices 3A, 3B, 13A and 13B, or a single memory having separable storage areas therein may be used. The storage capacity of each memory device may be limited to a data unit, thus resulting in low cost low capacity memories; or the memory capacity may be sufficient to store a number of data units.

It is intended that the appended claims be interpreted as including the foregoing alternatives as well as all equivalents to the disclosed invention.

What is claimed:

1. A method of recording a total of IB (IB is an integer) successive bytes of data in successive sectors on a disk medium by N recording heads (N≧2) comprising the steps of (a) dividing said bytes into successive data units, each data unit being formed of DB (DB<IB) successive bytes (b) writing each data unit of N successive data units into a respective one of N memory devices having a memory capacity of BB bytes, wherein DB=BB when (IB/N)≧BB and wherein DB=IB/N when (IB/N)<BB (c) reading a data unit DB from said respective memory device to a predetermined one of said N recording heads for recording in several successive sectors by said predetermined head; and (d) repeating steps (b) and (c).

2. The method of claim 1 wherein N=2.

3. The method of claim 1 wherein a data unit is read from one memory device while each of the remaining memory devices has a data unit written thereto.

4. The method of claim 3 wherein each recording head records several successive sectors in a respective area on said disk medium such that N successive areas are recorded by said N recording heads respectively.

5. Apparatus for recording a total of IB (IB is an integer) successive bytes of data in successive sectors on a disk medium, comprising:

N memory devices (N≧2), each having a memory capacity of BB bytes to store a data unit formed of DB (DB<IB) successive bytes wherein DB=BB when (IB/N)≧BB and wherein DB=IB/N when (IB/N)≦BB;

write means for sequentially writing a data unit into a respective one of said N memory devices;

read means for sequentially reading from said N memory devices the data units stored therein; and N recording heads, each supplied with a respective data unit read from a predetermined one of said memory devices to record said data unit in said successive sectors.

6. The apparatus of claim 5 wherein N=2.

7. The apparatus of claim 5 wherein said read means is operable to read a data unit from one memory device while said write means is operable to write a data unit into the remaining memory devices.

8. The apparatus of claim 7 wherein said recording head records several successive sectors in a respective area on said disk medium such that N successive areas are recorded by said N recording heads repetitively.

9. A method of reproducing successive bytes of data recorded in several successive sectors located in a respective one of plural areas on a disk medium by N reproducing heads (N≧2) wherein a total of IB bytes (IB is an integer) are recorded on said disk medium comprising the steps of: (a) reading a data unit formed of DB (DB≦IB) successive bytes from a respective area by one of said reproducing heads; (b) writing the read data unit into a respective one of N memory devices each having a memory capacity of BB bytes, wherein DB=BB when (IB/N)≧BB and DB=IB/N when (IB/N)≦BB; (c) repeating steps (a) and (b) and (d) reading from each of said N memory devices, in sequence, the data unit written therein so as to recover successive data units.

10. The method of claim 9 wherein N=2.

11. The method of claim 10 wherein a data unit is written to one memory device while the other memory device has a data unit read therefrom.

12. The method of claim 9 wherein each reproducing head reads several successive sectors from said respective area so that N successive areas are read by said N reproducing heads repetitively.

13. Apparatus for reproducing successive bytes of data recorded in several successive sectors located in a respective one of plural areas on a disk medium wherein a total of IB bytes (IB is an integer) are recorded on said disk medium comprising:

N reproducing heads (N≧2), each for reading a data unit formed of DB (DB<IB) successive bytes from a respective area on said disk medium;

N memory devices each coupled to a respective head and each having a memory capacity of BE bytes, for temporarily storing a data unit read by tBB head coupled thereto wherein DB=BB when (IB/N)≧BB and DB=IB/N when (IB/N)≦BB; and read means for reading from said N memory devices, in sequence, the data units stored therein so as to recover successive data units.

14. The apparatus of claim 13 wherein said N reproducing heads read said data units in sequence.

15. The apparatus of claim 13 wherein N=2.

16. The apparatus of claim 15 wherein alternate reproducing heads read data units to write the read data unit into one memory device while the other memory device has the data unit therein read therefrom.

17. The apparatus of claim 13 wherein each reproducing head reads several sectors from said respective area so that N successive areas are read by said N reproducing heads repetitively.

* * * * *